H. F. RODEMEYER & C. R. MARTIN.
HAY RAKE.
APPLICATION FILED DEC. 16, 1914.
1,185,593.
Patented May 30, 1916.
2 SHEETS—SHEET 2.
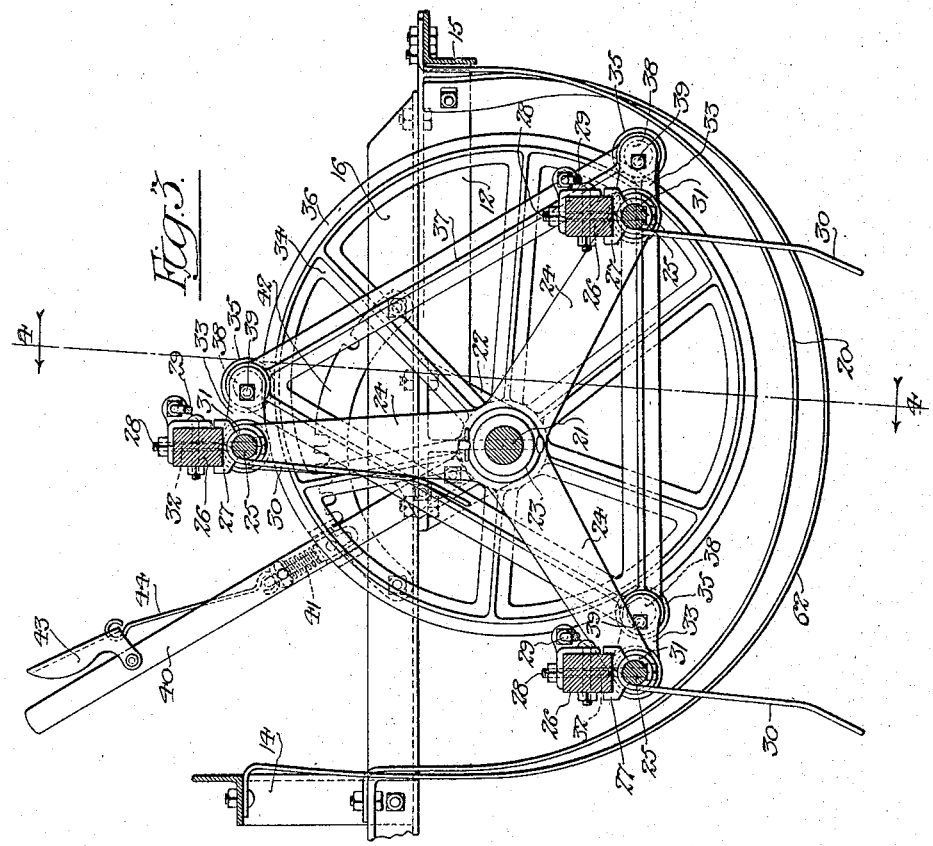
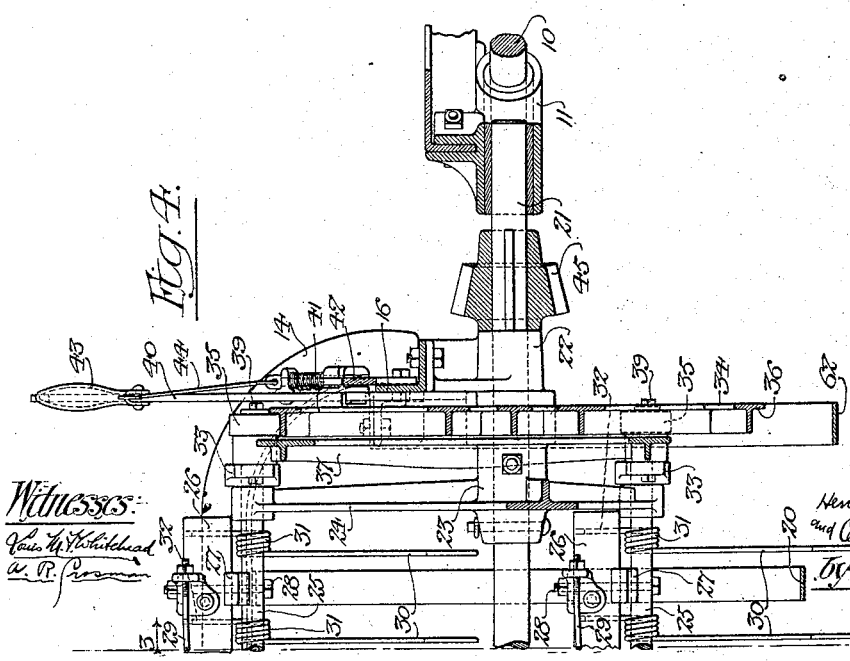

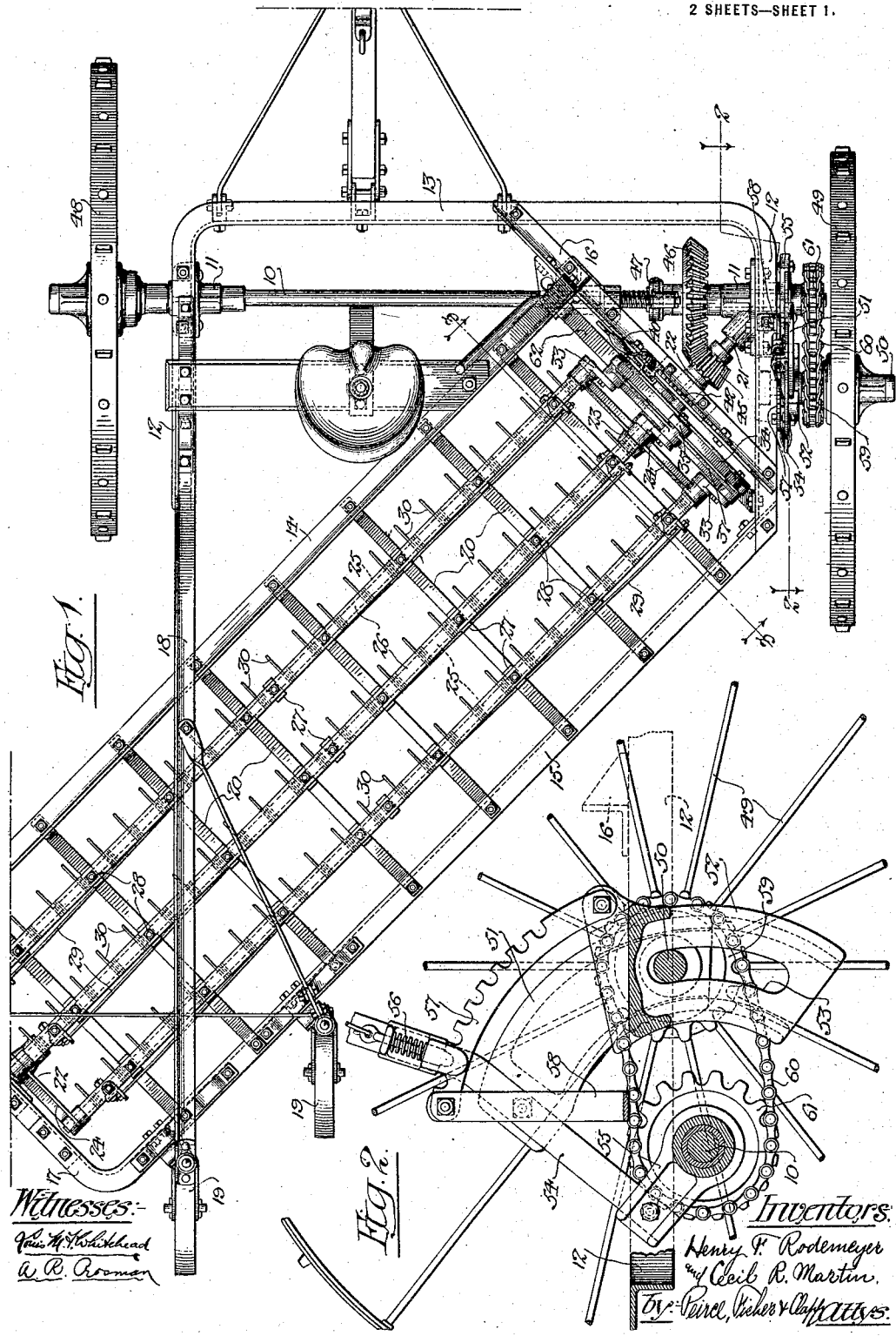

UNITED STATES PATENT OFFICE.

HENRY F. RODEMEYER AND CECIL R. MARTIN, OF STERLING, ILLINOIS, ASSIGNORS TO STERLING MANUFACTURING COMPANY, OF ROCK FALLS, ILLINOIS, A CORPORATION.

HAY-RAKE.

1,185,593. Specification of Letters Patent. Patented May 30, 1916.

Application filed December 16, 1914. Serial No. 877,541.

*To all whom it may concern:*

Be it known that we, HENRY F. RODEMEYER and CECIL R. MARTIN, citizens of the United States, and residents of Sterling, county of Whiteside, and State of Illinois, have invented certain new and useful Improvements in Hay-Rakes, of which the following is a full, clear, and exact description.

The invention relates to a hay rake and more particularly to side delivery rakes having a rotatable rake member inclined to the line of draft.

The invention seeks to provide means for vertically adjusting the front end of the rake and to provide improved means for controlling the angle of the rake teeth.

The invention consists in the features of improvement hereinafter set forth, illustrated in the preferred form in the accompanying drawings and more particulary pointed out in the appended claims.

In the drawings Figure 1 is a plan view of the improved rake. Fig. 2 is a detailed elevation with the parts shown in section on the line 2—2 of Fig. 1. Fig. 3 is a vertical section on the lines 3—3 of Figs. 1 and 4. Fig. 4 is a detail section on the line 4—4 of Fig. 3.

The wheel axle 10 of the machine is journaled in bearings 11 fixed to short parallel side bars 12. These side bars extend rearwardly from and are preferably formed integral with a transverse front bar 13. The raking reel is arranged within an inclined rectangular frame comprising front and rear inclined bars 14 and 15 and connecting end bars 16 and 17. The forward portion of the rectangular reel frame is secured to the front bar 13 and to one of the short side bars 12. A rearwardly extending hanger bar 18 connected to the opposite side bar 12 extends rearwardly over the reel and reel frame and is suitably connected thereto. The rear end of the reel frame is also supported by caster wheels 19. The front bar 14 of the rectangular reel frame is provided with downwardly turned end portions and curved stripper bars 20 are connected to the front and rear bars of the reel frame. The parts thus far described may be of any suitable or usual construction.

The reel shaft 21 is journaled in suitable bearings 22 in the end bars 16 and 17 of the reel frame. Spiders 23 are rigidly secured to the ends of the shaft 20 and are provided with radial arms 24 (three in number in the form shown,) which carry the rake heads. Each rake head comprises a shaft 25 journaled in the spider arms 24, and a parallel wooden bar 26 secured to the shaft by clamps 27, bolts 28 and brace rods 29. Each rake head carries a series of teeth 30 having spring coils 31 extending about the shafts 25 and inner end portions 32 which extend within sockets in the wooden bars 29. As the reel is rotated, the rake heads are adjusted to maintain the teeth at a proper angle by means of crank arms 33 fixed to the forward ends of the rock shafts 25 and which coöperate with an eccentric member 34. This eccentric is of considerable size and to reduce its weight it is of skeleton form and its hub is mounted upon the inner portion of the bearing 22 for the forward end of the shaft 20. The crank arms 33 may directly engage the eccentric, but are preferably provided with rollers 35 which engage the peripheral rim thereof. Preferably, as shown in Figs. 3 and 4, the eccentric is provided with a guiding flange 36 at the outer edge of its peripheral surface and which aids in guiding the rollers 35 on the crank arms 33.

To hold the rollers in engagement with the peripheral surface of the eccentric, connections are provided between the crank arms 33. In the preferred construction shown, these connections are in the form of a triangular member or frame 37, the corners of which are journaled upon pins 38 fixed to the crank arms and which also serve to carry the rollers 35. The pins 38 are connected to the crank arms 33 by bolts 39 which extend eccentrically through the pins. In this way, adjustable connections are provided between the pins and the crank arms.

It should be noted that the rollers 35 form anti-friction devices between the stationary eccentric member and the rotating parts controlled thereby. This improved construction obviates the necessity of employing the ordinary eccentric and eccentric strap; but instead employs two coöperating members, one mounted on the frame and the other connected to the crank arms of the rake heads, one of the coöperating members being provided with a series of rollers which engage a circular track on the other member. This arrangement simplifies the construction, reduces the friction and is not apt to become clogged by the winding of hay upon the parts.

It will be understood that ordinarily the eccentric 34 is held against movement, but to vary the angle of the rake teeth to suit different conditions and also to raise the teeth in passing to and from the field, means are provided for rotatably adjusting the eccentric 34. For this purpose, a hand lever 40 is rigidly secured to the hub of the eccentric 34 and by means of this hand lever the eccentric may be rotatably adjusted about the shaft 21. The lever 40 is provided with a spring-held dog 41, which is arranged to engage with any one of a series of notches in a segment 42 on the adjacent frame bar 16 to thereby hold the eccentric 34 in adjusted position. The dog 41 is connected to the usual pivoted trip 43 on the hand lever by a link 44.

The forward end of the inclined rake shaft 21 is arranged adjacent one end of the wheel axle or drive shaft 10 and is provided with a beveled pinion 45 which meshes with a beveled gear 46 upon the wheel axle. The gear 46 is loose on the wheel axle and a suitable clutch 47 is provided to throw the driving gearing for the rake into and out of operation.

The wheel axle or drive shaft 10 is rotated by two large main supporting wheels 48 and 49. The wheel 48 at the side of the machine opposite the forward end of the inclined rake is directly mounted on the wheel axle or shaft 10, but the wheel 49 adjacent the forward end of the rake is mounted upon a short stub axle 50 and suitable means is provided for adjustably connecting the frame to the stub axle 50 so that the forward end of the inclined rake may be raised and lowered. Means are also provided for connecting the wheel 49 to the main drive shaft or axle 10 so that power is transmitted from the wheel to the shaft.

As shown, the stub axle is fixed to a supporting plate 51 which is movable within a guiding bracket 52 that is fixed to and depends from the adjacent side bar 12. As shown, the supporting plate 51 and guiding bracket 52 are segmental and are concentric with the drive shaft or main axle 10. Preferably also the inner end of the stub axle 50 extends through a segmental guiding slot 53 in the bracket 52.

The upper end of the segmental plate 51 is rigidly connected to an adjusting lever 54 the lower end of which is rigidly secured to an arm 55 rotatably mounted upon the main shaft or axle 10. By means of the shift lever 54 the parts of the frame adjacent the supporting wheel 49 and the forward end of the rake can be raised and lowered. To hold the parts in adjusted position, the lever 54 is provided with a spring-held dog 56 which is arranged to engage any one of a series of notches in a segment bar 57. The latter is fixed at its ends to the bracket 52 and to an upright bar 58 which rises from the adjacent side bar 12. In this way, the front end of the rake can be adjusted as desired or elevated to move the teeth well away from the ground.

Inasmuch as the guiding connections between the supporting wheel 49 and the frame are preferably concentric with the main axle or drive shaft 10, the latter can be readily geared to the wheel 49 without interfering with the raising and lowering movement of the adjacent parts of the frame. In the preferred construction shown, the hub of the wheel 49 is provided with a sprocket wheel 59 and a chain 60 passes over this wheel and over a sprocket 61 on the adjacent end of the main axle 10.

It should be noted that in the construction shown the main axle 10 is driven by both the supporting wheels 48 and 49, that the adjacent ends of the main axle and of the inclined rake shaft are directly connected preferably by beveled gears, and that means are provided for raising and lowering the front end of the reel without interfering with the drive mechanism therefor. The supporting wheels 48 and 49 are provided with the usual ratchet hubs which form one-way connections between the wheels and the main wheel axle or drive shaft and permit the backing and turning movements of the machine. Preferably, as shown, a curved guard bar 62 extends beneath the eccentric 34.

Changes may be made in the construction set forth without departure from the essentials of the invention as defined in the claims.

We claim as our invention:—

1. In a hay rake, the combination with a rotatable reel, and heads journaled on said reel and provided with rake teeth, of means for maintaining said rake teeth at the desired angle to the ground comprising crank arms on said rake heads, a normally stationary eccentric having a circular periphery, means for constantly maintaining said crank arms in engagement with said eccentric, and means for adjusting said eccentric to vary the angle of the rake teeth to the ground.

2. In a hay rake, the combination of a rotatable raking reel, rake heads journaled thereon, crank arms on said heads, a controlling eccentric, and connections between said crank arms for maintaining the same in engagement with the periphery of said eccentric.

3. In a hay rake, the combination of a rotatable reel, rake heads journaled thereon, arms fixed to said heads and provided with crank pins, a controlling eccentric, a frame connecting said crank pins and holding the same in engagement with the periphery of said eccentric, and a shifter for adjusting said eccentric.

4. In a hay rake, the combination of a rotatable reel, rake heads journaled thereon, crank arms on said heads provided with rollers, an adjustable eccentric, and connections between said crank arms for holding said rollers in contact with the periphery of said eccentric.

5. In a hay rake, the combination with a rotatable reel and rake heads journaled on said reel and provided with teeth, of means for maintaining the rake teeth at the desired angle to the ground comprising crank arms on said rake heads, a normally stationary, adjustable, eccentric member, a coöperating member connected to said crank arms, one of said members having a circular track, and a series of rollers on the other member engaging said track.

6. In a hay rake, the combination with a rotatable reel, a reel shaft and rake heads journaled on said reel and provided with teeth, of means for maintaining said rake teeth at the desired angle to the ground comprising crank arms on said rake heads, a normally stationary member eccentrically and adjustably mounted on said reel shaft, a coöperating member connected to said crank arms, one of said members having a circular track and the other member being triangular in form, and anti-friction rollers at the corners of said triangular member engaging said circular track.

7. In a side delivery hay rake, the combination with a frame, a main, transverse wheel axle and an inclined rotatable rake member journaled in said frame, of a stub axle for the ground wheel adjacent the forward end of said rake member, an adjustable support for said stub axle, means for guiding said support and said stub axle in an arc concentric with said wheel axle, gearing connecting said stub axle and said main axle, gearing connecting said main axle and said rake member, a shift lever pivotally mounted on said main frame and connected to said support for adjusting the same, a notched quadrant mounted on the main frame and a dog connected to said shift lever and coöperating with said quadrant to hold said lever in adjusted position, substantially as described.

8. In a side delivery hay rake, the combination of a frame, a main transverse wheel axle and an inclined, rotatable rake member journaled in said frame, ground wheels connected to said main axle to rotate the same, a stub axle for the ground wheel adjacent the forward end of said rake member, an adjustable support for said stub axle, a guide fixed to said frame wherein said support is slidable, and an adjusting shifter connected to said support, and drive gearing connecting the forward end of said rake member to the adjacent end of said main wheel axle.

9. In a side delivery hay rake, the combination of a frame, a transverse main axle and an inclined, rotatable rake member journaled in said frame, a stub axle adjacent the forward end of said rake member, a segmental support and a coöperating guide bracket concentric with said main axle and connected respectively to said stub axle and to said frame, supporting wheels mounted respectively on said stub axle and said main axle, and connected to the latter to rotate the same, means for adjusting said support and stub axle in said guide, and beveled gears connecting the forward end of said rake member and the adjacent end of said main wheel axle.

10. In a side delivery hay rake, the combination of a frame, a transverse main axle and an inclined, rotatable rake member journaled in said frame, a stub axle adjacent the forward end of said rake member, a segmental support and a coöperating guide bracket concentric with said main axle, and connected respectively to said stub axle and to said frame, supporting wheels mounted respectively on said stub axle and said main axle, and connected to the latter to rotate the same, a shift lever mounted on said main axle and connected to said segmental support, and drive gearing connecting said main axle and said rake member.

11. In a side delivery hay rake, the combination with a frame of a transverse main axle and an inclined rotatable rake member journaled in bearings fixed to said frame, a stub axle adjacent the forward end of said rake member, a support for said stub axle, a coöperating guide bracket for said support concentric with said main axle, supporting wheels mounted respectively on said main axle and on said stub axle, chain and sprocket gearing between said main axle and a wheel on said stub axle, drive gearing connecting said main axle and said rake member and adjustable connections interposed between the main frame and said support and including an adjustable shift lever.

HENRY F. RODEMEYER.
CECIL R. MARTIN.

Witnesses:
 IDA M. LEE,
 FRED S. HOWE.

Copies of this patent may be obtained for five cents each, by addressing the "Commissioner of Patents, Washington, D. C."